United States Patent [19]

Dougherty

[11] 4,012,342
[45] Mar. 15, 1977

[54] CATALYST-CONTAINING FIBERS AND THE POLYMERIZATION OF OLEFINS THEREON

[75] Inventor: Herbert W. Dougherty, Cranford, N.J.

[73] Assignee: Exxon Research and Engineering Company, Linden, N.J.

[22] Filed: Feb. 18, 1963

[21] Appl. No.: 259,439

Related U.S. Application Data

[60] Continuation-in-part of Ser. No. 715,178, Feb. 14, 1958, abandoned, which is a division of Ser. No. 550,515, Dec. 1, 1955, Pat. No. 3,008,943.

[52] U.S. Cl. .......................... 260/2.5 B; 260/17 A; 260/859 R; 260/873; 260/881; 264/49; 428/403

[51] Int. Cl.² ........................................... C08J 9/26

[58] Field of Search .............. 260/2.5 B, 93.7, 94.9, 260/17.4; 8/116 R

[56] References Cited

UNITED STATES PATENTS

| | | | |
|---|---|---|---|
| 2,542,771 | 2/1951 | Hanford et al. | 260/175 |
| 2,905,661 | 9/1959 | Muehlbauer | 260/94.9 B |
| 3,083,118 | 3/1963 | Bridgeford | 8/127.6 |

*Primary Examiner*—Morton Foelak
*Attorney, Agent, or Firm*—John J. Mahon

[57] ABSTRACT

The invention relates to polymerizing olefins in the presence of organic fibers and then removing the fibers to obtain hollow polyolefin resins.

6 Claims, No Drawings

CATALYST-CONTAINING FIBERS AND THE POLYMERIZATION OF OLEFINS THEREON

This application is a continuation-in-part application of U.S. Pat. Ser. No. 715,178, filed Feb. 14, 1958, now abandoned which is a division of application Ser. No. 550,515, now U.S. Pat. No. 3,008,943, filed Dec. 1, 1955.

The present invention relates to polymerizing olefins, especially lower alpha olefins, in the presence of organic fibers and the compositions formed by such polymerization. More particularly, the invention pertains to the use of catalysts associated with or sorbed on organic fibers, such as cellulose, in the polymerization of olefins at relatively low pressures for the production of polymers of high molecular weight which coat such fibers.

In one of its aspects, the invention involves the polymerization of olefins, such as ethylene, to high molecular weight polymers at relatively low pressures in the presence of catalysts obtained by reacting a reducing metal-containing material with a reducible heavy metal compound. An important feature of the invention is the use of catalyst supports consisting of organic fibers containing polar groups, which fibers are insoluble in the liquid reaction medium used in the catalyst forming reaction and/or in the polymerization reaction itself.

Prior to the present invention, it was found that ethylene and other lower alpha olefins such as propylene, isobutylene, 1-butene, etc., can be polymerized at relatively low pressures not substantially exceeding atmospheric pressure in a liquid reaction medium when using various combinations of reducing metals or metal compounds, e.g. alkali and alkaline earth metals, their hydrides and alloys; aluminum compounds, such as aluminum hydride, aluminum alkyls, e.g. trialkyls, alkyl aluminum halides, etc.; with various reducible heavy metal compounds, such as the halides, acetyl acetonates, etc., of the metals of Groups IV-VI and VIII of the Periodic System (Lange's Handbook of Chemistry, eighth edition, pages 56–57), e.g. of titanium, zirconium and iron in a liquid solvent for the catalyst components. The reaction leads to the formation of a soluble catalyst portion and an insoluble precipitate consisting primarily of reduced heavy metal component, which together form the active polymerization catalyst.

Among the most active types of catalyst for this reaction are combinations of trialkyl aluminum or dialkyl aluminum halide with titanium polyhalides e.g. titanium tetrahalides. More specifically, excellent results have been obtained when using combinations of triethyl aluminum or diethyl aluminum chloride with titanium tetrachloride, obtained by simply mixing the catalyst components at atmospheric temperature in suitable solvents in such a way that the valence of the titanium is reduced. These catalysts have been found to afford high yields of good quality, high molecular weight, solid, high softening point polymers of ethylene and other olefins even at pressures as low as, or closely approaching, atmospheric pressure.

In accordance with the present invention, polymerization catalysts are produced by intimately contacting a metal-containing material having reducing activity with a reducible heavy metal compound in a liquid medium in the presence of a nonhydrocarbon organic catalyst support of high surface area which is solid under catalyst formation and polymerization conditions and insoluble in any liquid reaction media used in the catalyst formation and/or polymerization reactions. Catalyst supports useful for the purposes of the present invention may be chosen from a wide variety of natural and synthetic fibers having polar functions, including fabrics made from such fibers, which do not destroy the effectiveness of the finished catalyst and which preferably do not affect the yield and properties of the polymer formed.

Fibers made from cellulose or any of the polyamides, known by the generic name "nylon," can be advantageously used in practicing the invention. The synthesis of nylon polymers is described in U.S. Pat. No. 2,130,948 and elsewhere. In addition to the cellulosic and polyamide fibers, fibers made from other solid synthetic polymers may be used as supports, including such polymers as polyethylene terephthalate (condensation polymer of ethylene glycol and terephthalic acid), polyacrylonitrile, and polyurethane. While cellulose is the preferred polymer, plastic polymers having recurring carbonyl or amide

groups in their molecules are quite useful.

In general, the organic catalyst support of the invention forms a major proportion of the finished catalyst. Proportions of, say, about 50 to 99 or 99.9 wt. % of organic catalyst support and 0.1 or 1 to 50 wt. % of active catalyst component, based on total catalyst, may be used. Catalysts consisting of about 80 to 99 or 99.9 wt. % of support and about 0.1 or 1 to 20 wt. % of active constituents are preferred, and it is especially preferred to employ natural or regenerated cellulose fibers containing about 0.1 to 10 wt. % catalyst. Such proportions of organic catalyst support correspond in normal operation to amounts of about 0.05 to about 5 wt. % based on final polymer product. However, the use of substantially larger proportions of organic catalyst support, say, up to about 50 wt. % or more of the final polymer product, is within the broader scope of the invention. In this case, the organic catalyst support selected should have no detrimental effect on the product and may even modify the same in a beneficial manner.

If desired, the organic fibers can be used as templates or foundations onto which new polymer is systematically built, in part being influenced by the underlying carrier structure. If a substantial amount of the original organic carrier material is present, the favorable properties of the polyolefin are superimposed on those of the carrier material.

The polyolefin coating on the filamentous substrate is usually about 1 to 200% of the thickness of the carrier. When cotton or paper fibers are used as the support, the coated fibers often weigh about 110 to 200% of the original weight of the fibers. Furthermore, the coated cellulosic fibers have a homogeneous appearance. That is to say, it is not possible to distinguish cellulosic material from the polyolefin with the naked eye.

By using a series of operations, sandwich-type products can be built up in which several types of organic products can be combined with one another. For example, the polymer product from the catalyzed operation can be added to other systems for producing synthetic materials retaining the polymer as the underlying or base material. When sheets of organic carrier materials, such as paper, or fibers therefrom, are used, they can be coated with layers of olefin polymers.

Of course, the operation can be so conducted as to permit the separation of the organic catalyst support from the product polymer. For this purpose, for example, an organic catalyst support which is soluble in a medium in which the polymer is insoluble, can be chosen. The choice or organic carriers suitable for this specific purpose is facilitated, particularly in the case of polyethylene as the product polymer, because of the fact that crystalline polymers of this type are insoluble in most conventional solvents below 100° C.

In preparing the catalyst, the fibers may be introduced into the catalyst preparation zone where it is preferably first contacted with a reducible heavy metal compound, such as $TiCl_4$, dissolved in a solvent. The resulting slurry may be heated, if desired, to complete the "adsorption" of the heavy metal compound on the carrier. This part of the treatment takes from several minutes to 1 to 2 hours. The "mixture" is then brought in contact with the reducing compound such as an aluminum alkyl compound (e.g. $AlR_3$ or $AlR_2Cl$, or $AlRCl_2$, etc.) dissolved in a suitable solvent to partially reduce the titanium compound.

For example, cellulose fibers can be dispersed in a hydrocarbon liquid diluent, and thereafter a small quantity of a reducible heavy metal compound is added. After the heavy metal compound has been contacted with the fibers, the reducing compound is added to the mixture either prior to or while the olefin monomer is introduced into the mixture to start the polymerization reaction on the surface of the fibers.

The order of formulating the catalyst-carrying composite can be varied to suit particular situations. Thus, the heavy metal compound can be added first or last, or simultaneously, with respect to the reducing metal component. In the case of porous organic supports, it may be preferred to avoid permeation of the adsorbent by the reducing material if this would cause a loss in effectiveness by occlusion. In some cases, this can be done by adding sufficiently large amounts of the heavy metal component so as to fill the pores (e.g. with $TiCl_4$) before contacting with the reducing material, e.g. an alkyl derivative of a metal of Groups I to III of the Periodic System, such as trialkyl aluminum.

The catalyst mixture so obtained may then be aged at suitable conditions of time and temperature, etc. It is generally preferable to exclude any olefinic material from the catalyst throughout the process of its preparation so that its active form is fully established before any olefin participates in the reaction. The finished catalyst may be introduced into the polymerization zone on a batch, semicontinuous or continuous basis, and the olefin polymerization reaction in turn may be carried out either batchwise, semicontinuously or continuously.

As mentioned above, the preferred catalyst support is cellulose. It is particularly useful to employ long, threadlike fibers of cellulose-containing materials, such as cotton and woody plants, because once the fibers have been coated with polymer in accordance with this invention, they can be utilized for a variety of purposes, such as the manufacture of disposable eating utensils, e.g. cups and plates, and food containers, e.g. milk cartons. Sheets of these coated fibers can be easily made by conventional cementing and molding techniques. The fiber should contain a substantial amount of cellulose, either in a native or regenerated form, e.g. viscose rayon and cellulose acetate. For most purposes, fibers or fabrics containing at least 10 wt. % cellulose will be satisfactory, although best results are generally obtained with fibers containing at least 50 wt. % cellulose; and it is preferred to utilize carriers consisting of at least 70 wt % cellulose.

The physical condition of the carrier materials can be varied to achieve desired advantages. Thus, the cellulosic materials can be highly shredded or pulverized to give materials as fine as cobwebs. As an alternative, those of the above materials which are synthetic can be so prepared as to develop a highly porous or network or cellular type of structure, into which the catalyst is introduced, and throughout which the new polymeric product is caused to form or develop. Nonwoven fabrics or mats may be used as supports. In other instances, these various materials can be treated with solvents or other chemical agents in order to extend the system. In still other instances, a solvent can be used to dissolve the materials which are then caused to be "precipitated" in a partial or complete degree, the choice of the solvent being governed by compatibility with catalyst reactants.

Regarding suitable active catalyst components, those employed and described heretofore in the low pressure polymerization of low molecular weight olefins to form high molecular weight polymers of the plastics type may be used. The reducing catalyst components of outstanding utility include the following aluminum compounds which contain alkyl groups having 2 to 8 carbon atoms: tri n-octyl aluminum, tri-isobutyl aluminum tripropyl aluminum and triethyl aluminum; and lower dialkyl aluminum halides such as diethyl aluminum chloride. Useful aluminum compounds of somewhat lower reducing activity include the following: dimethyl aluminum halides, trimethyl aluminum, methyl and ethyl aluminum dihalides, higher dialkyl aluminum halides and trialkyl aluminum compounds having alkyl groups higher than about $C_{10}$. Mixtures of aluminum alkyls can also be used to reduce the heavy metal compounds. For example, mixtures containing ethyl aluminum dichloride and diethyl aluminum chloride have been successfully used to produce active catalysts in this manner. Similarly, mixtures of ethyl aluminum dichloride and triethyl aluminum or of diethyl aluminum chloride and triethyl aluminum can be used. All these compounds as well as methods for their preparation are well known in the art. Quite generally, in addition to trialkyl or aryl aluminum compounds organo-aluminum compounds carrying two hydrocarbon radicals or at least one hydrocarbon radical and one hydrogen, as well as an electron attracting group, such as an alkoxy, halogen, organic nitrogen or sulfur radical, etc., may be used.

Other suitable reducing materials include the alkali and alkaline earth metals, their alloys, hydrides and their alkyl and/or aryl compounds, as well as quite generally the alkyl and aryl derivatives of other metals which have sufficient stability to permit reaction in their compound form with a reducible heavy metal compound.

Reducible heavy metal compounds suitable for the purposes of the invention include such inorganic compounds as the halides, oxy-halides, complex halides, oxides, hydroxides, and organic compounds such as alcoholates, acetates, benzoates and acetyl acetonates of the transition metals of the IV, V, VI and VII periods of the Periodic system, e.g. titanium, zirconium, hafnium, thorium, uranium, vanadium, niobium, tantalum, chromium, molybdenum, tungsten and manganese, as well as iron and copper. The metal halides, particularly the chlorides, are generally preferred, titanium, vanadium and zirconium being the most active of these metals. The following heavy metal compounds are relatively readily reducible titanium tetrabromide, titanium tetrachloride and zirconium acetylacetonate. The relatively difficultly reducible compounds include ferrous chloride, chromic chloride and manganese chloride.

Particularly striking results have been obtained by applying the present invention to ethylene polymerization carried out with catalysts prepared by reacting triethyl aluminum, diethyl aluminum chloride or mixtures of diethyl aluminum chloride with triethyl aluminum as the reducing agent with titanium tetrachloride as the heavy metal component.

The catalysts are quite generally prepared by intimately mixing the aluminum compound or other reducing component, e.g. aluminum or titanium metal, and the heavy metal compound, preferably in a solvent or diluent and in a nonoxidizing atmosphere, while stirring. Paraffinic hydrocarbons, such as n-heptane or other saturated petroleum or synthetic hydrocarbon oils, are the most suitable solvents.

The molar ratio of the aluminum compound to the heavy metal compound in the catalyst mixture may vary widely. In general, the higher the polymer molecular weight desired, the higher should be this ratio. A preferred molar ratio for alkyl aluminum compounds to titanium tetrachloride for making polymers above 20,000 molecular weight is about 0.2 to 12:1. Molar ratios of 0.2 to 6:1, and especially substantially equimolar porportions, based on metal component in each compound, are highly suitable. If a prereduced catalyst is used, e.g. titanium trichloride, the molar ratio is preferably about 0.5 to 3:1.

If the fiber or fabric contains a substantial amount of water, it is best to remove essentially all of the water prior to treating the support with the catalysts. The drying may be accomplished by any technique, in a conventional oven or by placing the support in a vacuum oven at 20 to 100 mm. of mercury absolute pressure and 20° to 80° C. for from several hours to a few days, or for longer periods of time if such are necessary to remove all but insignificant amounts of residual water. Fibers which contain about 0.05 to 0.001 wt. % water are suitable for use in the present process.

A surprising feature of this invention is that filamentous materials containing polar groups, such as hydroxyl and carboxyl groups, can be used as supports because these functions usually have an adverse effect on the activity of low pressure polyolefin catalysts.

The polymerization process employing the catalysts prepared in accordance with the invention is carried out at conditions normally used heretofore in the low pressure polymerization of olefins to prepare high molecular weight polymers suitable as "plastics" and for similar purposes. These conditions depend somewhat on the specific olefin involved and on the type of polymer desired. Ethylene is the preferred monoolefin although other higher molecular weight olefins, such as propylene, butenes, styrene, hexadecene, butadiene, etc., may be used alone or in mixtures. The polymers produced have molecular weights above 2000 and may range as high as from 300,000 to 3,000,000 and more as determined by the intrinsic viscosity method using the I. Harris correlation (J. Polymer Science 8, 361 (1952)). In the case of ethylene, the polymerization is carried out by intimately contacting gaseous ethylene with the catalyst of the invention, for example, by bubbling the ethylene into a suspension of the catalyst in an inert solvent or diluent. Neither the polymerization temperature nor the polymerization pressure is particularly critical. It is preferred, however, to operate at temperatures of about 0° to 150° C., such as 25° to 90° C.

Pressures ranging anywhere from atmospheric or subatmospheric to 50 to 250 atmospheres have been used heretofore in the low pressure polymerization of ethylene and other olefins on catalysts of the type improved by the present invention. Similar pressures may be used for the process of the invention.

The reaction is preferably carried out under careful exclusion of oxygen while stirring in batch or continuous operation. When operating batchwise, olefin introduction is continued until the catalyst is exhausted and the reaction ceases, or until the desired amount of polymer has been formed. In order to permit stirring even after the formation of substantial amounts of solid polymer, solvents or diluents may be used. These diluents which should be liquid at the operating conditions include aliphatic, hydroaromatic and aromatic hydrocarbons, such as pentane, hexane, higher paraffins, cyclohexane, tetrahydronaphthalene, decahydronaphthalene, benzene, xylene, halogenated aromatic hydrocarbons, e.g. mono- or dichlorobenzenes. The polymer concentration in the reaction mixture may be about 5 to 40 wt. %.

The amount of catalyst used can vary within wide limits depending somewhat on the purity of the olefin feed. Proportions of as little as 0.1 part by weight of active catalyst constituent per 1,000 parts by weight of olefin are sufficient if the feed is pure. With olefin feed streams containing about 0.01% of water oxygen, carbon dioxide or certain other oxygenated compounds, catalyst proportions of about 0.5 to 5 wt. % on the same basis are usually adequate.

Upon completion of the polymerization reaction, the catalyst is completely deactivated, e.g. by the addition of an alcohol, such as isopropyl alcohol or n-butyl alcohol in amounts of about 10 to 100 times the amount of catalyst used. The reaction slurry may then be filtered, the filter cake reslurried in a catalyst solvent, such as dry, concentrated alcohol at about 50° to 100° C. for 15 to 60 minutes, filtered again and the filter cake dried preferably under reduced pressure. Ash residues in the polymer are reduced below about 0.02% by this procedure.

If desired, the fibers can be first formed into shaped articles, such as films or sheets, before treating them with the catalyst and encapsulating the materials with polyolefins in accordance with the invention.

The polymer coated fibers and fabrics produced by the present invention are useful in making various articles, such as water repellent sheets, milk cartons, etc.

The invention will be best understood by reference to the following specific examples.

EXAMPLE I

A glass vessel which had previously been dried in an oven was charged with 10.0 g. of paper fibers which had the appearance of cotton and a density of 0.020 g./cc. The paper fibers had been dried in a vacuum oven under an absolute pressure of about 20 mm. of mercury and at a temperature of 60° C. for 24 hours. Normal heptane (250 ml.) containing 5.0 ml. of 1 molar solution titanium tetrachloride in n-heptane was added to the dried paper fiber in the reaction vessel. The resulting mixture was stirred; and, after about five minutes, 10 ml. of a 1 molar solution of triethyl aluminum in normal heptane, diluted with 50 ml. of dry normal heptane, was added to the mixture over a period of 10 minutes. It was noted that upon the addition of the alkyl aluminum solution, the mixture turned dark brown, indicating that the titanium tetrachloride was reduced by the aluminum compound. The temperature during the reduction step was maintained at about 50° C. by means of an external heat source. After all of the reducing compound was added to the mixture, 1 liter of dry normal heptane was added to further dilute the reaction mixture, and thereafter heat was applied to bring the temperature to 50° C. and pure propylene was introduced into the liquid reaction mixture. The propylene was passed into the reaction mixture at the rate of 3,600 cc./min. during the first 5 minutes of the polymerization reaction. No exit gas was recovered during this period, indicating total absorption of the propylene; and, furthermore, cooling was required in order to maintain the reaction temperature at about 50° C. Thereafter, during the next hour, the propylene feed rate was reduced to 1,500 cc./min., and it was necessary to apply heat during the latter part of the aforementioned period in order to maintain the reaction temperature. From the quantity of exit gas recovered, it appeared that the polymerization was substantially complete after the first 15 minutes.

The reaction mixture was cooled, and 45 cc. of isopropyl alcohol was added to quench the reaction. If desired, a small amount (i.e. about 1 to 10 wt. %) of a conventional chelating agent, such as 2,4-pentanedione, 2,3-butanedione, diphenyl diketone or other diketone, may be added with the alcohol to reduce the ash content of the coated fibers to about 0.005%. Following the addition of the isopropyl alcohol, the reaction mixture was poured into an additional amount of isopropanol (2 liters) and stirred. The solid portion of the reaction mixture was separated from the liquid by means of filtration, and the coated fibers recovered were dried in a vacuum oven at about 20 mm. of mercury absolute pressure and at about 60° C. The paper fibers coated with propylene weighed 14.6 g. The product appeared to be homogeneous in that one could not identify paper fibers with the naked eye.

The fibers prepared in the aforementioned manner can be pressed in a mold at about 30° to 260° C., e.g. 150° C., to produce a film which is resistant to many substances, including water.

Alternatively, a sheet of paper may be used in place of the paper fibers in the above example and an encapsulated article is obtained.

EXAMPLE II

A glass polymerization vessel, which had been previously dried in an oven and purged with nitrogen, was charged with 6.0 g. of dry cotton fibers containing about 0.005 wt. % water. Thereafter, 5 ml. of a 1 molar solution of titanium tetrachloride in normal heptane was added in admixture with 35 ml. of dry normal heptane. The titanium tetrachloride was mixed with the cotton fibers for about five minutes, and then 12.5 cc. of 1 molar aluminum sesquichloride $Al(C_2H_5)_{1.5}Cl_{1.5}$ in normal heptane diluted with 30 ml. of dry normal heptane. The resulting mixture was warmed to 75° C.; and, after about 40 minutes, 400 ml. of dry normal heptane was added to the mixture. Thereafter, ethylene was passed through the liquid reaction mixture at the rate of 940 cc./min. for a period of 1 hour. During the polymerization reaction, the temperature ranged between 50° and 72° C. Upon termination of the addition of ethylene, the reaction mixture was cooled and the quenched by adding 45 ml. of isopropyl alcohol containing 5 ml. of 2,4-pentanedione. The reaction mixture was then poured into 2 liters of isopropanol, stirred and filtered. The solid material recovered by filtration was dried in a vacuum oven at 60° C. for 48 hours. The dry product weighed 7.0 g. and had a homogeneous appearance.

The polyethylene-coated cotton fibers can be coated with conventional bonding agents, pressed together and dried to form a cemented article which is highly useful in applications that call for a film or molded article that is resistant to water and other liquids. Typical bonding agents include dilute resorcinol-formaldehyde solutions, hydrocarbon solutions of low molecular weight rubbers, e.g. styrene-butadiene, casein solutions, epoxy resins and urea-formaldehyde solutions.

EXAMPLE III

Wood fibers obtained by shredding wood are coated with polyethylene in the manner described in Example II. The wood fibers can be woven into fabric first before treating them in accordance with the invention.

EXAMPLE IV

Example II is repeated using fibers of rayon viscose in place of the dry cotton fibers.

EXAMPLE V

A glass vessel which had previously been dried in an oven was charged with 10.6 g. of nylon 6-10 fibers that were 0.5 inch long and measuring about 200 denier thick. The fibers had a density of 1.05 g./cc. The fibers had been dried in a vacuum oven under an absolute pressure of about 20 mm. of mercury and at a temperature of 60° C. for 24 hours. Normal heptane (40 ml.) containing 5.0 ml. of 1 molar solution titanium tetrachloride in n-heptane was added to the fibers in the reaction vessel. The resulting mixture was stirred; and, after about 5 minutes, 10 ml. of a 1 molar solution of triethyl aluminum in normal heptane diluted with 20 ml. of dry normal heptane was added to the mixture over a period of 10 minutes. It was noted that upon the addition of the alkyl aluminum solution, the mixture turned dark brown, indicating that the titanium tetrachloride was reduced by the aluminum compound. The temperature of the mixture was maintained at about 30° C. with stirring and then it was heated to 50° C. by means of an external heat source for 15 minutes. After all of the reducing compound was added to the mixture, 0.5 liter of dry normal heptane was added to further dilute the reaction mixture, and thereafter heat was applied to bring the temperature to 50° C. and pure propylene was introduced into the liquid reaction mixture. The propylene was passed into the reaction mixture at the rate of 2,500 cc./minute during the first 5 minutes of the polymerization reaction. Seven hundred cc./minute of exit gas was recovered during this period, indicating a substantial adsorption of the propylene. Thereafter, during the 50 minutes, the propylene feed rate was maintained between 940 and 1,200 cc./minute. After the first 12 minutes, the volume of exit gas was substantially the same as the volume of feed gas. Furthermore, it was necessary to apply heat during the latter part of the aforementioned period in order to maintain the reaction temperature. The temperature of the mixture was raised 10° to 20° C. during the last 20 minutes. From the quantity of exit gas recovered, it appeared that the polymerization was substantially complete after about 12 minutes.

The reaction mixture was cooled, and 40 cc. of isopropyl alcohol and 5 cc. of 2,4-pentanedione, a chelating agent, were added to quench the reaction. Following the addition of the isopropyl alcohol and chelating agent, the reaction mixture was poured into an additional amount of isopropanol (2 liters) and stirred. The solid portion of the reaction mixture was separated from the liquid by means of filtration, and the coated fibers recovered were dried in a vacuum oven under about 20 mm. of mercury absolute pressure and at about 60° C. The nylon fibers coated with propylene weighed 21.0 g. Examination of the fibers under a microscope showed a scale-like deposit on the fibers.

The fibers prepared in the aforementioned manner can be pressed in a mold at about 350° to 420° C. to produce a film which is resistant to many liquid substances, including water.

EXAMPLE VI

Dried staple fibers of polyethylene terephthalate are treated in the manner described in Example V and propylene is polymerized in the presence of the treated fibers according to the method described in said example. The recovered fibers show polypropylene deposited on their surface.

EXAMPLE VII

Dried polyacrylonitrile staple fibers are treated in the manner described in Example V and ethylene is polymerized in the presence of the treated fibers under the conditions used for propylene in the aforementioned example. An examination of the fibers shows they are coated with solid polyethylene.

The term "sorbed" as used herein in connection with the catalyst means any physical or chemical attachment of the catalyst to the surface of the fibers.

The invention is not limited to the amounts and conditions in the foregoing examples. For instance, hay, straw, flax and hemp may also be utilized in lieu of the cellulosic fibers used above. The relative proportions of the materials used and the reaction conditions may be varied within the limits indicated in the specification to obtain products of varying characteristics.

What is claimed is:

1. A high molecular weight, normally solid polymer of a lower alpha olefin coated on organic fibers containing polar groups wherein said fibers are cellulose fibers or fibers of plastic polymers having recurring amide groups in their molecules.

2. The organic fibers of claim 1 in which the fibers are made from a polyamide.

3. Organic fibers containing polar groups wherein said fibers are cellulose fibers or fibers of plastic polymers having recurring amide groups in their molecules and having on their surface a high molecular weight, normally solid olefin polymer produced by contacting a lower alpha olefin with said fibers containing on their surface a polymerization catalyst comprising an alkyl aluminum compound and a partially reduced titanium chloride under polymerization conditions.

4. The fibers of claim 3 wherein the fibers have a lower molecular weight alpha monoolefin polymerized on their surface and the fibers are bonded together.

5. A free-flowing mixture of cellulose fibers each of which is substantially encased in a distinctly separate shell of polymerized ethylene said polymer shell being separable from said cellulose fibers by chemical means.

6. A free-flowing mixture of cellulose fibers each of which is substantially encased in a distinctly separate shell of polymerized propylene said polymer shell being separable from said cellulose fibers by chemical means.

* * * * *